(12) United States Patent
Fukuta et al.

(10) Patent No.: US 7,230,248 B2
(45) Date of Patent: Jun. 12, 2007

(54) CERAMIC SCINTILLATOR, AND RADIATION DETECTOR AND RADIOGRAPHIC EXAMINATION APPARATUS USING SAME

(75) Inventors: Yukihiro Fukuta, Yokohama (JP); Hiroyasu Oota, Tokyo (JP); Masaaki Tamatani, Fujisawa (JP)

(73) Assignees: Kabushiki Kaisha Toshiba, Tokyo (JP); Toshiba Materials Co., Ltd., Yokohama-shi (JP)

( * ) Notice: Subject to any disclaimer, the term of this patent is extended or adjusted under 35 U.S.C. 154(b) by 0 days.

(21) Appl. No.: 10/547,314
(22) PCT Filed: Sep. 24, 2004
(86) PCT No.: PCT/JP2004/013888

§ 371 (c)(1),
(2), (4) Date: Aug. 31, 2005

(87) PCT Pub. No.: WO2005/028591

PCT Pub. Date: Mar. 31, 2005

(65) Prior Publication Data
US 2006/0145085 A1   Jul. 6, 2006

(30) Foreign Application Priority Data
Sep. 24, 2003  (JP)  .............................. 2003-331489

(51) Int. Cl.
*G01T 1/20* (2006.01)
(52) U.S. Cl. ................................................. 250/370.11
(58) Field of Classification Search ........... 250/370.11, 250/339.02, 339.12
See application file for complete search history.

(56) References Cited

U.S. PATENT DOCUMENTS

| | | |
|---|---|---|
| 5,609,793 A | 3/1997 | Yokota et al. |
| 5,640,016 A | 6/1997 | Matsuda et al. |
| 6,504,156 B1 | 1/2003 | Takahara et al. |

FOREIGN PATENT DOCUMENTS

| | | | |
|---|---|---|---|
| DE | 100 34 227 A1 | | 1/2001 |
| EP | 0 659 864 A1 | | 6/1995 |
| JP | 02006590 A | * | 1/1990 |
| JP | 03243686 A | * | 10/1991 |
| JP | 07-188655 A | | 7/1995 |
| JP | 07-238281 A | | 9/1995 |
| JP | 07-252476 A | | 10/1995 |
| JP | 09-202880 A | | 8/1997 |
| JP | 2001-089762 A | | 4/2001 |
| JP | 2001-131546 A | | 5/2001 |
| JP | 2004-204053 A | | 7/2004 |

\* cited by examiner

*Primary Examiner*—Dave Porta
*Assistant Examiner*—Marcus Taningco
(74) *Attorney, Agent, or Firm*—Foley & Lardner LLP

(57) ABSTRACT

A ceramic scintillator comprises a sintered body of a lutetium oxysulfide phosphor containing at least one element selected from Pr, Tb and Eu as an activator. The sintered body of a lutetium oxysulfide phosphor contains 5 to 15 ppm of an alkali metal element and 5 to 40 ppm of phosphorus. Such a ceramic scintillator can sufficiently make use of the intrinsic characteristics of the lutetium oxysulfide phosphor and has good sensitivity in X-ray detection even when it is downsized.

9 Claims, 2 Drawing Sheets

CERAMIC SCINTILLATOR, AND RADIATION DETECTOR AND RADIOGRAPHIC EXAMINATION APPARATUS USING SAME

TECHNICAL FIELD

The present invention relates to a ceramic scintillator which converts radiation into visible light, and a radiation detector using the scintillator and a radiographic examination apparatus using the detector.

BACKGROUND ART

In the fields of medical diagnosis, industrial non-destructive inspection and the like, inspections using a radiographic examination apparatus such as an X-ray computed tomography apparatus (hereinafter referred to as the X-ray CT apparatus) or the like are in practice. The X-ray CT apparatus emits a fan-shaped X-ray beam from an X-ray tube to an object, collects X-ray absorption data transmitted through the object by an X-ray detector, analyzes the X-ray absorption data by a computer and reconstructs a tomogram of the object.

For the X-ray detector of the X-ray CT apparatus, there is used a solid state scintillator which, when excited by X-rays, emits visible light or the like. For such a solid state scintillator, it is considered to apply a ceramic scintillator which consists of a sintered body of a rare earth oxysulfide phosphor such as gadolinium oxysulfide, lanthanum oxysulfide, lutetium oxysulfide or the like activated by praseodymium (Pr), terbium (Tb), europium (Eu) or the like (see Patent Documents 1 to 3). Especially, gadolinium oxysulfide phosphor ($Gd_2O_2S$:Pr or the like), which is excellent in luminous efficiency and has characteristics such as a short afterglow and the like, is in practice as a scintillator material for the X-ray detector.

The X-ray CT apparatus is desired to have a higher resolution. For example, a conventional X-ray CT apparatus is impossible to realize it, and it is demanded to provide an image of alveoli. To provide the X-ray CT apparatus with a higher resolution, there is a tendency to make the X-ray detecting element more compact, and it is necessary to fabricate a ceramic scintillator in smaller size. Therefore, there is a situation that the gadolinium oxysulfide phosphor does not always have sufficient X-ray absorption. When the X-ray absorption by the scintillator is insufficient, X-ray photon noises are produced, and the quality of the X-ray CT image is deteriorated considerably.

Accordingly, a lutetium oxysulfide phosphor ($Lu_2O_2S$: Pr, $Lu_2O_2S$: Tb, $Lu_2O_2S$: Eu or the like), which has a large X-ray absorption coefficient and provides a sufficient luminous efficiency even when the ceramic scintillator is fabricated in smaller size, is being watched with interest as a ceramic scintillator material for a next-generation X-ray CT apparatus. The lutetium oxysulfide phosphor is now attempted to be produced by a flux method in the same manner as the gadolinium oxysulfide phosphor or the like. But, the lutetium oxysulfide phosphor is poor in crystal growth ability, and it is therefore necessary to add a large amount of flux (a crystal growth agent such as $A_3PO_4$ or $A_2CO_3$ (A: an alkali metal element)) in comparison with the gadolinium oxysulfide phosphor or the like.

The lutetium oxysulfide phosphor produced by using a relatively large amount of flux, which is excellent in crystalline property and has a relatively uniform grain diameter, is considered to be suitable as a ceramic scintillator forming material. But, the lutetium oxysulfide phosphor powder applying a large amount of flux has a drawback that translucency is easily impaired because coloring occurs when the ceramic scintillator (a sintered body of a lutetium oxysulfide phosphor) is produced by applying, for example, a hot pressing method, a HIP (hot isostatic pressing) process or the like.

The coloring of the ceramic scintillator and a degradation in translucency due to the coloring cause a decrease of light emission output, resulting in impairing a characteristic such as a high light emission rate which is based on a large X-ray absorption coefficient inherent in the lutetium oxysulfide phosphor. Thus, the conventional ceramic scintillator does not utilize sufficiently characteristics such as high luminous efficiency and the like on the basis of the large X-ray absorption coefficient inherent in the lutetium oxysulfide phosphor.

It is described in Patent Literature 2 that the provision of a sintered body of the rare earth oxysulfide phosphor with a high density is promoted by adjusting the amount of $PO_4$ residue of a ceramic scintillator formed of the rare earth oxysulfide phosphor to 50 ppm or less. But, simple reduction of the amount of phosphoric acid in the sintered body (a sintered body (R: Y, Gd, La, Lu) of $(R_{1-x-y}Pr_xCe_y)_2O_2S$ phosphor) of the rare earth oxysulfide phosphor cannot enhance with good reproducibility the luminous efficiency of the ceramic scintillator applying the lutetium oxysulfide phosphor.

Meanwhile, Patent Literature 3 describes a rare earth oxysulfide phosphor ($(R_{1-x}RE_x)_2O_2S$ phosphor (R: Y, Gd, La, Lu, RE: Tb, Eu, Tm, Pr)) containing at least one element selected from Cs and Rb in a range of 0.2 to 50 ppm. It enhances a filling density of phosphor particles at the time of producing a radiological image conversion sheet by improving the grain shape of rare earth oxysulfide phosphor powder by Cs or Rb, and does not intend to improve the translucency of the ceramic scintillator (a sintered body of the rare earth oxysulfide phosphor).

Patent Document 1: Japanese Patent Laid-Open Application No. HEI 7-238281

Patent Document 2: Japanese Patent Laid-Open Application No. HEI 9-202880

Patent Document 3: Japanese Patent Laid-Open Application No. 2001-131546

SUMMARY OF THE INVENTION

According to an aspect of the present invention, there is provided a ceramic scintillator which can be provided with a good X-ray detection sensitivity even when it is miniaturized by making full use of the original properties of a lutetium oxysulfide phosphor. According to another aspect of the present invention, there are provided a radiation detector which can provide an improved resolution and the like by applying the above ceramic scintillator and a radiographic examination apparatus using the radiation detector.

The ceramic scintillator of the present invention is a ceramic scintillator provided with a sintered body of a lutetium oxysulfide phosphor containing as an activator at least one element selected from Pr, Tb and Eu, wherein the sintered body of the lutetium oxysulfide phosphor contains an alkali metal element in a range of 5 ppm or more and 15 ppm or less and phosphorus in a range of 5 ppm or more and 40 ppm or less.

The radiation detector of the present invention is a radiation detector, comprising a fluorescence generation means which is provided with the ceramic scintillator according to the present invention and causes the ceramic scintillator to emit light according to incident radiation; and a photoelectric conversion means which receives light from the fluorescence generation means and converts the light output into electrical output. And, a radiographic examination apparatus of the present invention comprises a radiation source which emits radiation to an object; and the radiation detector according to the present invention which detects the radiation transmitting through the object.

MODES FOR IMPLEMENTING THE INVENTION

Embodiments of the present invention will be described with reference to the accompanying drawings. The embodiments of the present invention are described with reference to the drawings, which are provided for illustration only, and the present invention is not limited to the drawings.

Figure 1:
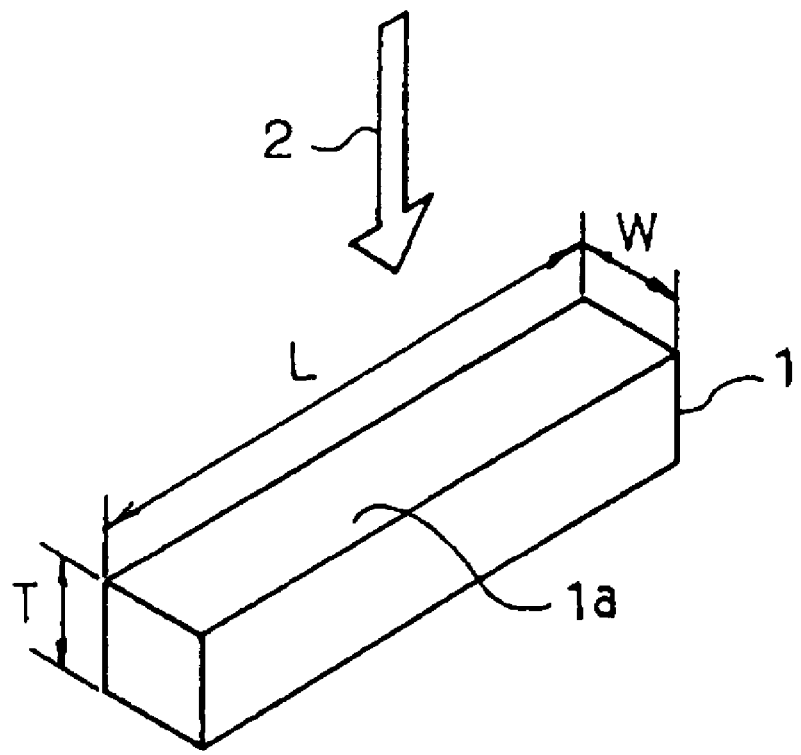
FIG. 1 is a perspective view showing a structure of a ceramic scintillator according to an embodiment of the present invention.

FIG. 1 is a perspective view showing a structure of a ceramic scintillator according to an embodiment of the present invention. A ceramic scintillator 1 shown in FIG. 1 is comprised of a sintered body of a lutetium oxysulfide ($Lu_2O_2S$) phosphor containing at least one element selected from praseodymium (Pr), terbium (Tb) and europium (Eu) as an activator. FIG. 1 shows a scintillator chip as an example of the ceramic scintillator. The ceramic scintillator of the present invention is not limited to have such a chip shape but can be formed to have various shapes depending on the X-ray detector and the like.

The lutetium oxysulfide phosphor which is a constituent material of the ceramic scintillator 1 preferably has a composition substantially expressed by:

General formula: $(Lu_{1-a}M_a)_2O_2S$ (1)

(where, M denotes at least one element selected from Pr, Tb and Eu, and a is a number satisfying $0.0001 \leq a \leq 0.2$). The Lu may be partly substituted by another rare earth element (at least one element selected from Y, La and Gd) but the substituted amount is preferably 30 mol % or less.

The lutetium oxysulfide phosphor which is activated by at least one M element selected from Pr, Tb and Eu has a large X-ray absorption coefficient and excellent light output per unit area in comparison with a conventional gadolinium oxysulfide phosphor. In other words, X-ray detection sensitivity and the like by the ceramic scintillator 1 can be improved. Therefore, it is particularly effective as a fluorescence generation means of an X-ray detector or the like used for an X-ray CT apparatus which is improved to have higher resolution. For the lutetium oxysulfide phosphor, at least one element selected from Pr, Tb and Eu is used as the activator. The activator may be any of Pr, Tb and Eu, and a lutetium oxysulfide phosphor activated by Pr is particularly suitable as a detector for the X-ray CT.

The content of an activator (at least one M element selected from Pr, Tb and Eu) is preferably in a range of 0.0001 to 0.2 as the value a of the above-described formula (1). If the value a indicating the content of the activator is less than 0.0001, a function as the activator which is a luminescence center cannot be exerted sufficiently, and the lutetium oxysulfide phosphor is degraded in luminous efficiency. Meanwhile, the luminous efficiency is also degraded if the value a exceeds 0.2. In addition to the above-described activator, another rare earth element such as Ce may be contained in a very small amount as a coactivator into the lutetium oxysulfide phosphor. A blending amount of the coactivator is enough if emission of light by Pr, Tb and Eu can keep a dominant state, and is preferably, for example, 50 ppm or less.

The ceramic scintillator 1 which is formed of the sintered body of the lutetium oxysulfide phosphor contains an alkali metal element in a range of 5 to 15 ppm and phosphorus in a range of 5 to 40 ppm in mass ratio. The alkali metal element is not limited to a particular one but may be any of lithium (Li), sodium (Na), potassium (K), rubidium (Rb) and cesium (Cs). It is particularly desirable to be at least one element selected from Li, Na and K. The contents of the alkali metal element and phosphorus specify the existential quantity in the sintered body of the lutetium oxysulfide phosphor.

By applying the sintered body of the lutetium oxysulfide phosphor containing the above-described contents of the alkali metal element and phosphorus, it becomes possible to realize the ceramic scintillator 1 with high purity and high density and the improvement of its translucency, with good reproducibility respectively. Specifically, a lutetium oxysulfide phosphor powder which is a material for the ceramic scintillator 1 is generally produced by applying a flux method using phosphate or carbonate of alkali metal as a crystal growth agent to enhance the crystalline property and to optimize the grain size distribution of the powder.

More specifically, as a starting material of the individual rare earth elements such as Lu, Pr and the like, rare earth oxide powder of lutetium oxide, praseodymium oxide or the like is prepared. Then, a sulfurizing agent such as sulfur (S) powder and a flux such as $A_3PO_4$ or $A_2CO_3$ (A: an alkali metal element) are added to and thoroughly mixed with the rare earth oxide powder. The obtained powder mixture is calcined at a temperature of 1100 to 1300° C. for 5 to 10 hours and washed with acid and water to obtain a lutetium oxysulfide phosphor powder.

An alkali metal element and phosphoric acid ion are necessarily mixed into the lutetium oxysulfide phosphor powder produced by the flux method. Phosphorus remains in the forms of phosphoric acid ion in the ceramic scintillator 1 (the sintered body of the lutetium oxysulfide phosphor) produced by using the lutetium oxysulfide phosphor powder as material powder. Especially, the lutetium oxysulfide phosphor is poor in crystal growth ability in comparison with a conventional gadolinium oxysulfide phosphor, so that it is necessary to add a relatively large amount of flux.

A specific amount of flux at the time of producing the lutetium oxysulfide phosphor must be about two times larger in comparison with that in the gadolinium oxysulfide phosphor production process. Therefore, the remaining of the alkali metal element and the phosphorus has a large effect on the properties of the ceramic scintillator 1. And, if the alkali metal element and the phosphorus remain in a large amount, the sintered body of the lutetium oxysulfide phosphor is colored to brown because of the remaining elements, causing the absorption of light (light emitted by irradiation of X-ray or the like) within the ceramic scintillator 1.

To prevent such coloring, it is effective to decrease the amounts of the alkali metal element and phosphorus remaining in the lutetium oxysulfide phosphor powder. But, if the amounts of the alkali metal element and phosphorus are decreased excessively, sintering property is degraded, and foreign crystal phases such as lutetium oxide, pores and the like are generated in the sintered body of the lutetium oxysulfide phosphor. If foreign phases, pores and the like are generated within the sintered body, light is scattered within the ceramic scintillator 1. The occurrence of the above-described coloring, foreign phases, pores and the like becomes a cause of lowering the light output of the ceramic scintillator 1.

If the alkali metal element and phosphorus remaining in the lutetium oxysulfide phosphor are in an appropriate amount, they serve as a sintering aid which promotes the sintering of the phosphor powder, but if they remain in a large amount, the sintered body is colored. Accordingly, the amount of the alkali metal element in the ceramic scintillator 1 is controlled to a range of 5 to 15 ppm and the amount of the phosphorus to a range of 5 to 40 ppm. By controlling the remaining amount of the alkali metal element and phosphorus in the lutetium oxysulfide phosphor powder to have the above-described amount of the alkali metal element and phosphorus in the sintered body, it is possible to obtain a high purity and high density ceramic scintillator 1 with excellent transparency. It is more preferable that the amount of the alkali metal element in the ceramic scintillator 1 is in a range of 6 to 10 ppm and the amount of the phosphorus is in a range of 10 to 30 ppm.

Even if the amount of the alkali metal element in the sintered body of the lutetium oxysulfide phosphor configuring the ceramic scintillator 1 exceeds 15 ppm or even if the amount of the phosphorus exceeds 40 ppm, coloring of the ceramic scintillator 1 becomes conspicuous. Thus, the emitted light is absorbed, and detection sensitivity is degraded. Meanwhile, even if the amount of the alkali metal element is less than 5 ppm or the amount of the phosphorus is less than 5 ppm, a foreign phase (e.g., unreacted rare earth oxide) other than the lutetium oxysulfide is produced in the sintered body, and pores, gaps or the like are produced due to the degradation of the sintering characteristic of the lutetium oxysulfide phosphor. The foreign phases, pores or the like cause scattering of light within the sintered body, degrading the detection sensitivity of the ceramic scintillator 1.

A volume ratio of the foreign phases, pores or the like in the sintered body is preferably 0.5% or less, and more preferably 0.1% or less. The color of the sintered body is not required to be colorless and transparent but may be in a range capable of keeping transparency. By controlling the amount of the alkali metal element and the amount of the phosphorus to the above-described range, the sintered body of the lutetium oxysulfide phosphor having excellent translucency can be obtained with good reproducibility. And, according to the sintered body of the lutetium oxysulfide phosphor, it becomes possible to provide the ceramic scintillator 1 with high light output and high sensitivity by fully utilizing the high light emission rate characteristic inherently possessed by the lutetium oxysulfide phosphor on the basis of the property (translucency) of high purity, high density and excellent transparency.

The ceramic scintillator 1 of this embodiment is used for the X-ray detecting element or the like of the X-ray detector of an X-ray CT apparatus described later. Especially, it is suitable for an X-ray CT apparatus which has the X-ray detecting element further miniaturized in order to realize high resolution. Specifically, to enhance the resolution of the X-ray CT apparatus, it is necessary to miniaturize the scintillator and to increase the number of channels. And, to obtain a high sensitivity characteristic by the scintillator fabricated into small size, it is important to enhance the X-ray absorption rate per unit area or the luminous efficiency.

For the scintillator demanded to have the above-described properties, the ceramic scintillator 1 of this embodiment applies the sintered body of the lutetium oxysulfide phosphor which has a large X-ray absorption coefficient and provides sufficient light output even when the ceramic scintillator is fabricated in small size. Besides, the sintered body of the lutetium oxysulfide phosphor is provided with properties, such as high purity, high density and excellent transparency. Therefore, it is suitable for the ceramic scintillator 1 which has an irradiation surface 1a of X-rays 2 miniaturized as shown in FIG. 1. By using the ceramic scintillator 1, it becomes possible to realize a high resolution X-ray CT apparatus or the like.

The above-described ceramic scintillator 1 is suitable when, for example, the X-ray irradiation surface 1a has a very small shape of width W of 0.1 to 1.0 mm and length L of 0.1 to 3.0 mm. In other words, when the sintered body of the lutetium oxysulfide phosphor according to this embodiment is applied, even the above very small ceramic scintillator 1 can provide sufficient light output. Thickness t of the ceramic scintillator 1 is determined appropriately depending on the dose, radiation intensity and the like of the X-ray 2. The thickness t is preferably set to a range of, for example, 1.0 to 2.0 mm.

For example, the ceramic scintillator 1 of this embodiment is produced as follows. Specifically, the above-described lutetium oxysulfide phosphor powder which has the amount of the alkali metal element and the amount of the phosphorus controlled, is sintered to produce the sintered body of the lutetium oxysulfide phosphor which becomes the ceramic scintillator 1. The amount of the alkali metal element and the amount of the phosphorus in the lutetium oxysulfide phosphor powder can be controlled according to the washing conditions (the number of times of acid washing and water washing treatments, etc.) after the calcination.

The lutetium oxysulfide phosphor powder can be sintered by applying a well-known sintering method such as the hot pressing, the HIP process or the like. Especially, it is preferable to apply the HIP process to conduct a sintering step because a high-density sintered body can be obtained with ease. The sintering step applying the HIP process is conducted by forming a lutetium oxysulfide phosphor powder into an appropriate shape by a rubber press, charging into a metal vessel or the like and conducting the HIP treatment. As a HIP condition, it is desirable to adjust a HIP temperature to a range of 1400 to 1600° C. And, it is preferable to adjust a HIP pressure to 98 MPa or more and a HIP time to 1 to 10 hours.

By conducting the HIP treatment under the above-described conditions, a sintered body of a lutetium oxysulfide phosphor having, for example, a relative density (a ratio to a theoretical density) of 99.5% or more, and preferably 99.8% or more, can be obtained with good reproducibility. If the sintered body has a relative density of less than 99.5%, the properties such as translucency, light output and the like desired by the ceramic scintillator 1 cannot be satisfied. The relative density is determined by measurement using the Archimedes method. The sintered body of the lutetium oxysulfide phosphor is used as the ceramic scintillator 1 after fabricating to a desired shape with a blade-saw or a wire-saw if required.

Figure 2:
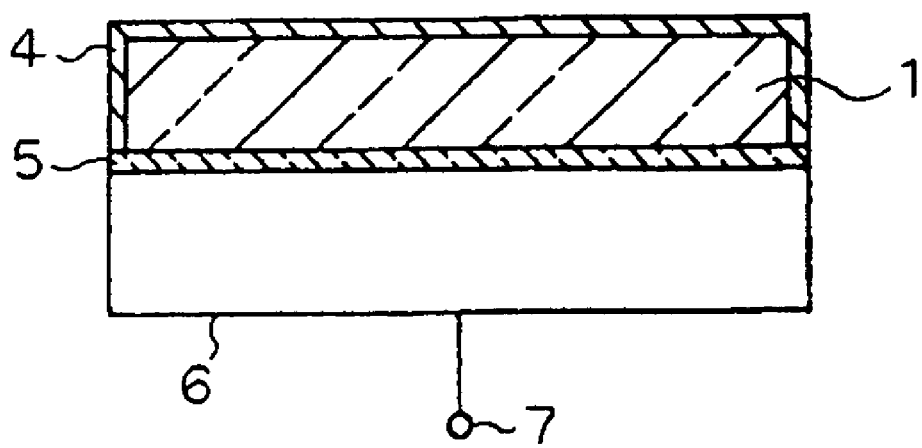
FIG. 2 is a diagram showing a schematic structure of an X-ray detector according to an embodiment of the present invention.

Then, an embodiment of a radiation detector and a radiographic examination apparatus according to the present invention will be described with reference to FIG. 2 and FIG. 3. FIG. 2 is a diagram showing a schematic structure of an X-ray detector as one embodiment of the radiation detector according to the present invention. An X-ray detector 3 shown in FIG. 2 and FIG. 3 has the ceramic scintillator 1 of the above-described embodiment, namely the ceramic scintillator (scintillator chip) 1 formed of the sintered body of the lutetium oxysulfide phosphor, as a fluorescence generation means. As described above, the ceramic scintillator 1 is not limited to the scintillator chip having a rectangular rod shape but may be, for example, a scintillator block which has plural segments integrated in lengthwise and breadthwise directions.

The rectangular rod-like ceramic scintillator 1 is covered with a reflection film 4 excepting one side. A photoelectric transducer such as a silicon photodiode 6 is fitted to the side of the ceramic scintillator 1, which is not covered with the reflection film 4, with an adhesive layer 5 interposed between them. When the scintillator block which has plural segments integrated is used as the ceramic scintillator 1, the silicon photodiodes and the like are arranged in correspondence with the individual segments.

In the above-described X-ray detector 3, X-rays enter the ceramic scintillator 1, and the ceramic scintillator 1 emits light depending on an amount of the entered X-rays. The light emitted from the ceramic scintillator 1 is detected by the photodiode 6. That is, the output of light emitted according to the amount of incident X-rays is converted into an electrical output through the photodiode 6 and output from an output terminal 7.

Figure 3:
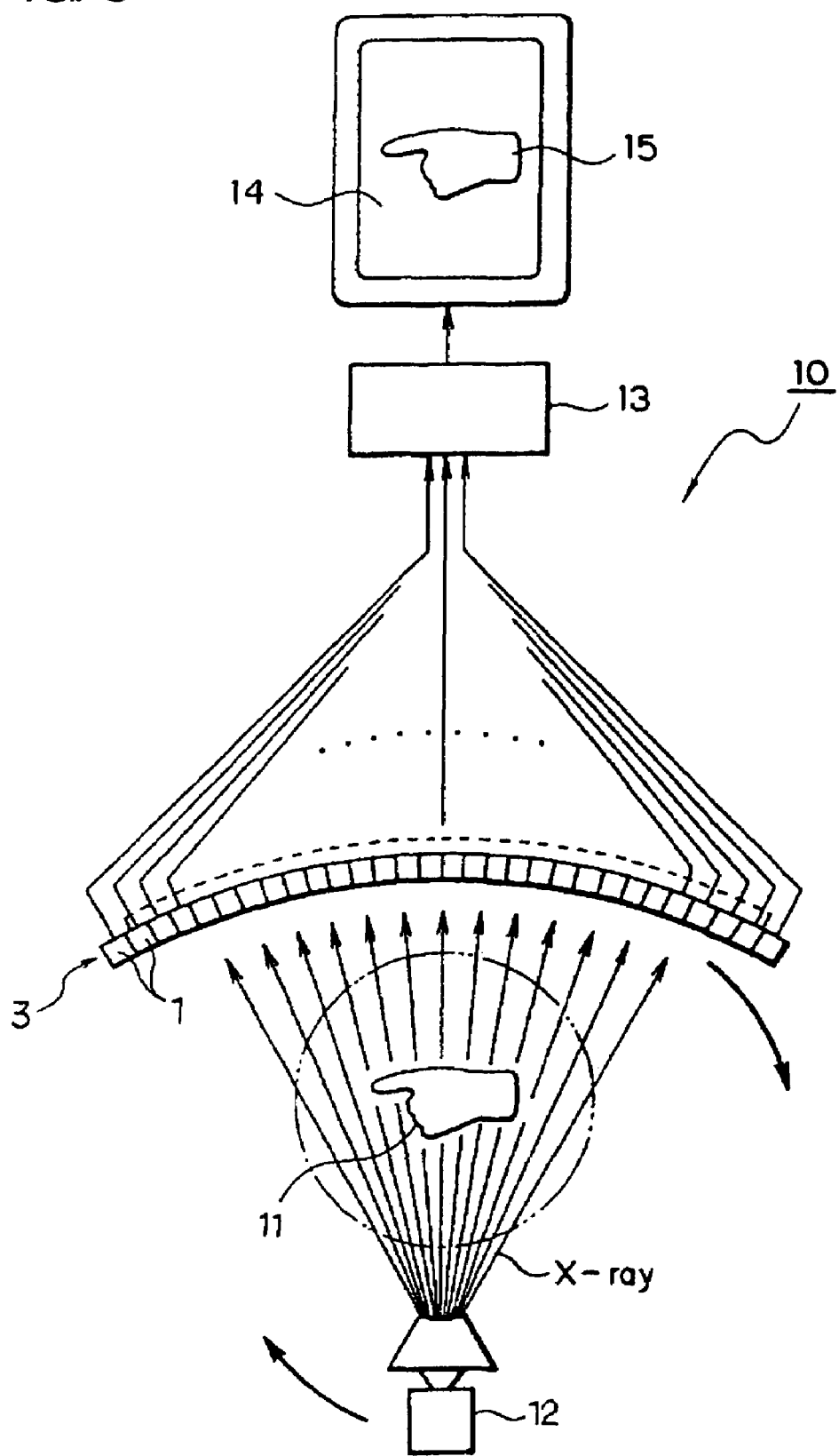
FIG. 3 is a diagram showing a schematic structure of an X-ray CT apparatus as one embodiment of the radiographic examination apparatus of the present invention.

FIG. 3 is a diagram showing a schematic structure of an X-ray CT apparatus as one embodiment of the radiographic examination apparatus of the present invention. An X-ray CT apparatus 10 shown in FIG. 3 has the X-ray detector 3 which is based on the detector structure of the above-described embodiment. The X-ray detector 3 shown in FIG. 3 has plural ceramic scintillators 1 which are arranged along an inside wall of a cylinder where an imaging part of an object 11 is positioned. A photodiode (not shown) is connected to the plural ceramic scintillators 1. An X-ray tube 12 for emitting X-rays is equipped at approximately the center of an arc where the X-ray detector 3 having the plural ceramic scintillators 1 is equipped.

The fixed object 11 is positioned between the X-ray detector 3 and the X-ray tube 12. It is configured to rotate the X-ray detector 3 and the X-ray tube 12 with the fixed object 11 at the center while irradiating the object 11 with X-rays. Thus, image information of the object 11 is three-dimensionally collected from different angles. Signals (electric signal converted by the photodiode) obtained by the X-ray irradiation are processed by a computer 13 and shown as an object image 15 on a display 14. The object image 15 is, for example, a tomogram of the object 11.

The X-ray CT apparatus 10 applies a high purity and high density sintered body with excellent transparency of the lutetium oxysulfide phosphor by which a satisfactory light output can be obtained even when miniaturized as the ceramic scintillators 1 of the X-ray detector 3. Therefore, it can comply with an increase of the number of channels for provision of high resolution without degrading the X-ray detection sensitivity. In other words, it is possible to realize the X-ray CT apparatus 10 which is provided with higher resolution while keeping the quality, accuracy and the like of an X-ray image. Thus, medical diagnosis ability and the like by the X-ray CT apparatus 10 are largely improved.

The radiographic examination apparatus of the present invention can be applied not only to an X-ray inspection apparatus for medical diagnosis but also to an X-ray non-destructive inspection apparatus for industrial use. The present invention contributes to the improvement of inspection precision by the X-ray nondestructive inspection apparatus.

Specific examples of the present invention and evaluated results will be described below.

EXAMPLE 1

First, as a material for a ceramic scintillator, a lutetium oxysulfide phosphor powder having an average particle diameter of 15 μm was prepared. This lutetium oxysulfide phosphor powder has a composition of $(Lu_{0.999}Pr_{0.001})_2O_2S$ and contains P of 45 ppm at a mass ratio and Na of 12 ppm as an alkali metal element. This lutetium oxysulfide phosphor powder was subjected to a cold isostatic pressing (CIP). The contents of the phosphorus and the alkali metal element in the lutetium oxysulfide phosphor powder were controlled according to the washing conditions after the calcination of the lutetium oxysulfide phosphor as described above. The same procedure is also applied to the following examples and comparative examples.

The resultant formed body was sealed in a Ta capsule, which is then set on an HIP processing apparatus. Ar gas was introduced as a pressurizing medium into the HIP processing apparatus, and the HIP processing was performed under conditions of a temperature of 1600° C., a pressure of 200 MPa and a period of 3 hours. A HIP sintered body had a relative density of 99.8% The HIP sintered body was fabricated so as to have a length of 3 mm, a width of 1 mm and a thickness of 1.5 mm to produce a target ceramic scintillator (scintillator chip). Phosphorus and sodium contents were measured, and they were 16 ppm and 11 ppm, respectively. The obtained ceramic scintillator was subjected to characteristic evaluation described later.

EXAMPLE 2

As a material for a ceramic scintillator, a lutetium oxysulfide phosphor powder having a composition of $(Lu_{0.999}Pr_{0.001})_2O_2S$ and containing P of 45 ppm at a mass ratio and K of 16 ppm as an alkali metal element was prepared. A scintillator chip formed of a sintered body of a lutetium oxysulfide phosphor was produced by the CIP forming and HIP processing under the same conditions as in Example 1 except that the prepared lutetium oxysulfide phosphor powder was used. This scintillator chip had a P content of 16 ppm, a K content of 13 ppm and a relative density of 99.8%. The ceramic scintillator was subjected to characteristic evaluation described later.

EXAMPLE 3

As a material for a ceramic scintillator, a lutetium oxysulfide phosphor powder having a composition of $(Lu_{0.999}Pr_{0.001})_2O_2S$ and containing P of 45 ppm at a mass ratio and Li of 15 ppm as an alkali metal element was prepared. A scintillator chip formed of a sintered body of a lutetium oxysulfide phosphor was produced by the CIP forming and HIP processing under the same conditions as in Example 1 except that the prepared lutetium oxysulfide phosphor powder was used. This scintillator chip had a P content of 16 ppm, an Li content of 13 ppm and a relative density of 99.8%. The ceramic scintillator was subjected to characteristic evaluation described later.

EXAMPLE 4

As a material for a ceramic scintillator, a lutetium oxysulfide phosphor powder having a composition of $(Lu_{0.999}Pr_{0.001})_2O_2S$ and containing P of 21 ppm at a mass ratio and Na of 8 ppm as an alkali metal element was prepared. A scintillator chip formed of a sintered body of a lutetium oxysulfide phosphor was produced by the CIP forming and HIP processing under the same conditions as in Example 1 except that the prepared lutetium oxysulfide phosphor powder was used. This scintillator chip had a P content of 6 ppm, an Na content of 6 ppm and a relative density of 99.8%. The ceramic scintillator was subjected to characteristic evaluation described later.

EXAMPLE 5

As a material for a ceramic scintillator, a lutetium oxysulfide phosphor powder having a composition of $(Lu_{0.999}Pr_{0.001})_2O_2S$ and containing P of 85 ppm at a mass ratio and Na of 12 ppm as an alkali metal element was prepared. A scintillator chip formed of a sintered body of a lutetium oxysulfide phosphor was produced by the CIP forming and HIP processing under the same conditions as in Example 1 except that the prepared lutetium oxysulfide phosphor powder was used. This scintillator chip had a P content of 37 ppm, an Na content of 11 ppm and a relative density of 99.8%. The ceramic scintillator was subjected to characteristic evaluation described later.

EXAMPLE 6

As a material for a ceramic scintillator, a lutetium oxysulfide phosphor powder having a composition of $(Lu_{0.95}Eu_{0.05})_2O_2S$ and containing P of 45 ppm at a mass ratio and Na of 12 ppm as an alkali metal element was prepared. A scintillator chip formed of a sintered body of a lutetium oxysulfide phosphor was produced by the CIP forming and HIP processing under the same conditions as in Example 1 except that the prepared lutetium oxysulfide phosphor powder was used. This scintillator chip had a P content of 16 ppm, an Na content of 11 ppm and a relative density of 99.8%. The ceramic scintillator was subjected to characteristic evaluation described later.

EXAMPLE 7

As a material for a ceramic scintillator, a lutetium oxysulfide phosphor powder having a composition of $(Lu_{0.99}Tb_{0.01})_2O_2S$ and containing P of 45 ppm at a mass ratio and Na of 12 ppm as an alkali metal element was prepared. A scintillator chip formed of a sintered body of a lutetium oxysulfide phosphor was produced by the CIP forming and HIP processing under the same conditions as in Example 1 except that the prepared lutetium oxysulfide phosphor powder was used. This scintillator chip had a P content of 16 ppm, an Na content of 11 ppm and a relative density of 99.8%. The ceramic scintillator was subjected to characteristic evaluation described later.

COMPARATIVE EXAMPLE 1

As a material for a ceramic scintillator, a lutetium oxysulfide phosphor powder having a composition of $(Lu_{0.999}Pr_{0.01})_2O_2S$ and containing P of 105 ppm at a mass ratio and Na of 12 ppm as an alkali metal element was prepared. A scintillator chip formed of a sintered body of a lutetium oxysulfide phosphor was produced by the CIP forming and HIP processing under the same conditions as in Example 1 except that the prepared lutetium oxysulfide phosphor powder was used. This scintillator chip had a P content of 49 ppm, an Na content of 11 ppm and a relative density of 99.8%. The ceramic scintillator was subjected to characteristic evaluation described later.

COMPARATIVE EXAMPLE 2

As a material for a ceramic scintillator, a lutetium oxysulfide phosphor powder having a composition of $(Lu_{0.999}Pr_{0.001})_2O_2S$ and containing P of 45 ppm at a mass ratio and containing Na of 69 ppm as an alkali metal element was prepared. A scintillator chip formed of a sintered body of a lutetium oxysulfide phosphor was produced by the CIP forming and HIP processing under the same conditions as in Example 1 except that the prepared lutetium oxysulfide phosphor powder was used. This scintillator chip had a P content of 16 ppm, an Na content of 54 ppm and a relative density of 99.8%. The ceramic scintillator was subjected to characteristic evaluation described later.

COMPARATIVE EXAMPLE 3

As a material for a ceramic scintillator, a lutetium oxysulfide phosphor powder having a composition of $(Lu_{0.999}Pr_{0.001})_2O_2S$ and containing P of 5 ppm at a mass ratio and Na of 3 ppm as an alkali metal element was prepared. A scintillator chip formed of a sintered body of a lutetium oxysulfide phosphor was produced by the CIP forming and HIP processing under the same conditions as in Example 1 except that the prepared lutetium oxysulfide phosphor powder was used. This scintillator chip had a P content of 3 ppm, an Na content of 2 ppm and a relative density of 99.2%. The ceramic scintillator was subjected to characteristic evaluation described later.

COMPARATIVE EXAMPLE 4

As a material for a ceramic scintillator, a lutetium oxysulfide phosphor powder having a composition of $(Lu_{0.95}EU_{0.05})_2O_2S$ and containing P of 45 ppm at a mass ratio and Na of 69 ppm as an alkali metal element was prepared. A scintillator chip formed of a sintered body of a lutetium oxysulfide phosphor was produced by the CIP forming and HIP processing under the same conditions as in Example 1 except that the prepared lutetium oxysulfide phosphor powder was used. This scintillator chip had a P content of 16 ppm, an Na content of 54 ppm and a relative density of 99.6%. The ceramic scintillator was subjected to characteristic evaluation described later.

Using the individual ceramic scintillators of Examples 1 to 7 and Comparative Examples 1 to 4, the X-ray detectors 3 were configured as shown in FIG. 2. X-rays with a tube voltage of 120 kVp were irradiated, and an X-ray detection sensitivity (light output) was measured. Using a ceramic scintillator (scintillator chip) having a composition of $(Gd_{0.999}Pr_{0.001})_2O_2S$ and a shape of a length of 3 mm, a width of 1 mm and a thickness of 2 mm as a comparative sample, an X-ray detection sensitivity was determined with the light output of the comparative sample assumed having 100 as a relative value. The X-ray detection sensitivities (light output) are shown in Table 1.

TABLE 1

| | Ceramic scintillator | | | X-ray detection |
|---|---|---|---|---|
| | Constituent material | P Content (ppm)* | Alkali element content (ppm)* | sensitivity (light output) (%, relative value) |
| Example 1 | $(Lu_{0.999}Pr_{0.001})_2O_2S$ | 16 (45) | Na: 11 (12) | 150 |
| Example 2 | $(Lu_{0.999}Pr_{0.001})_2O_2S$ | 16 (45) | K: 13 (16) | 147 |
| Example 3 | $(Lu_{0.999}Pr_{0.001})_2O_2S$ | 16 (45) | Li: 13 (15) | 147 |
| Example 4 | $(Lu_{0.999}Pr_{0.001})_2O_2S$ | 6 (21) | Na: 6 (8) | 153 |
| Example 5 | $(Lu_{0.999}Pr_{0.001})_2O_2S$ | 37 (85) | Na: 11 (12) | 125 |
| Example 6 | $(Lu_{0.95}Eu_{0.05})_2O_2S$ | 16 (45) | Na: 11 (12) | 165 |
| Example 7 | $(Lu_{0.99}Tb_{0.01})_2O_2S$ | 16 (45) | Na: 11 (12) | 144 |
| Comparative Example 1 | $(Lu_{0.999}Pr_{0.001})_2O_2S$ | 49 (105) | Na: 11 (12) | 77 |
| Comparative Example 2 | $(Lu_{0.999}Pr_{0.001})_2O_2S$ | 16 (45) | Na: 54 (69) | 47 |
| Comparative Example 3 | $(Lu_{0.999}Pr_{0.001})_2O_2S$ | 3 (5) | Na: 2 (3) | 50 |
| Comparative Example 4 | $(Lu_{0.95}Eu_{0.05})_2O_2S$ | 16 (45) | Na: 54 (69) | 65 |

TABLE 1-continued

| | Ceramic scintillator | | | X-ray detection |
|---|---|---|---|---|
| | Constituent material | P Content (ppm)* | Alkali element content (ppm)* | sensitivity (light output) (%, relative value) |
| Comparative Sample | $(Gd_{0.999}Pr_{0.001})_2O_2S$ | — | — | 100 |

*Numerals in parentheses are contents of P and alkali element in material powder.

It is apparent from Table 1 that the ceramic scintillators formed of lutetium oxysulfide according to Examples 1 to 7 are superior in light output to a conventional ceramic scintillator formed of gadolinium oxysulfide. Meanwhile, the ceramic scintillators formed of lutetium oxysulfide (Comparative Examples 1, 2, 4) with the content of at least one of phosphorus and an alkali metal element exceeding the range of the present invention are poor in light output. It is because the sintered body of the lutetium oxysulfide phosphor is colored to brown. The ceramic scintillator of lutetium oxysulfide (Comparative Example 3) with the contents of the phosphorus and the alkali metal element less than the range of the present invention is also poor in light output. It is because the sintered body of the lutetium oxysulfide phosphor has a low density and light is scattered within the sintered body.

EXAMPLES 8 THROUGH 14

Sintered bodies of $(Lu_{1-a}Pr_a)_2O_2S$ phosphors having Pr component, P content and alkali element content shown in Table 2 were produced in the same way as in Example 1. The P content and alkali element content in each of the sintered bodies were controlled according to the P amount, alkali element amount and the like in the material powder. The individual sintered bodies have a relative density as shown in Table 2. The sintered bodies of the lutetium oxysulfide phosphors were used to produce scintillator chips (having the same shape as in Example 1), and X-ray detection sensitivities (light output/a relative value with light output of the comparative sample determined as 100) were measured in the same way as in Example 1. The measured results are also shown in Table 2.

TABLE 2

| | Pr component (atomic %) | P content (ppm) | Alkali element content (ppm) | | | Total (ppm) | Relative density (%) | Light output (%, relative value) |
|---|---|---|---|---|---|---|---|---|
| | | | Na | K | Li | | | |
| Example 8 | 0.05 | 16 | 11 | — | — | 27 | 99.8 | 135 |
| Example 9 | 0.05 | 16 | — | 13 | — | 29 | 99.8 | 130 |
| Example 10 | 0.05 | 16 | — | — | 15 | 31 | 99.8 | 127 |
| Example 11 | 0.1 | 16 | 4 | 4 | 4 | 28 | 99.8 | 148 |
| Example 12 | 1 | 16 | 11 | — | — | 27 | 99.8 | 127 |
| Example 13 | 1 | 16 | — | 13 | — | 29 | 99.8 | 125 |
| Example 14 | 1 | 16 | — | — | 15 | 31 | 99.8 | 125 |

EXAMPLES 15 THROUGH 25

Sintered bodies of $(Lu_{1-a}Eu_a)_2O_2S$ phosphors having Eu component, P content and alkali element content shown in Table 3 were produced in the same way as in Example 1. The P content and alkali element content in each of the sintered bodies were controlled according to the P amount, alkali element amount and the like in the material powder. The individual sintered bodies have a relative density as shown in Table 3. The sintered bodies of the lutetium oxysulfide phosphors were used to produce scintillator chips (having the same shape as in Example 1), and X-ray detection sensitivities (light output/a relative value with light output of the comparative sample determined as 100) were measured in the same way as in Example 1. The measured results are also shown in Table 3.

TABLE 3

|  | Eu component | P content | Alkali element content (ppm) | | | Total | Relative density | Light output (%, relative |
|---|---|---|---|---|---|---|---|---|
|  | (atomic %) | (ppm) | Na | K | Li | (ppm) | (%) | value) |
| Example 15 | 0.3 | 16 | 11 | — | — | 27 | 99.8 | 180 |
| Example 16 | 0.3 | 16 | — | 13 | — | 29 | 99.8 | 176 |
| Example 17 | 0.3 | 16 | — | — | 15 | 31 | 99.8 | 175 |
| Example 18 | 0.3 | 16 | 4 | 4 | 4 | 28 | 99.8 | 175 |
| Example 19 | 3 | 16 | 11 | — | — | 27 | 99.8 | 170 |
| Example 20 | 3 | 16 | — | 13 | — | 29 | 99.8 | 170 |
| Example 21 | 3 | 16 | — | — | 15 | 31 | 99.8 | 169 |
| Example 22 | 5 | 16 | — | 13 | — | 29 | 99.8 | 162 |
| Example 23 | 5 | 16 | — | — | 15 | 31 | 99.8 | 160 |
| Example 24 | 5 | 6 | 6 | — | — | 12 | 99.8 | 170 |
| Example 25 | 5 | 37 | 11 | — | — | 48 | 99.8 | 150 |

EXAMPLES 26 THROUGH 36

Sintered bodies of $(Lu_{1-a}Tb_a)_2O_2S$ phosphors having the Tb components, P contents and alkali element contents shown in Table 4 were produced in the same way as in Example 1. The P content and alkali element content in each of the sintered bodies were controlled according to the P amount, alkali element amount and the like in the material powder. The individual sintered bodies have the relative density as shown in Table 4. The sintered bodies of the lutetium oxysulfide phosphors were used to produce scintillator chips (having the same shape as in Example 1), and X-ray detection sensitivities (light output/a relative value with light output of the comparative sample determined as 100) were measured in the same way as in Example 1. The measured results 15 are also shown in Table 4.

TABLE 4

|  | Tb component | P content | Alkali element content (ppm) | | | Total | Relative density | Light output (%, relative |
|---|---|---|---|---|---|---|---|---|
|  | (atomic %) | (ppm) | Na | K | Li | (ppm) | (%) | value) |
| Example 26 | 0.2 | 16 | 11 | — | — | 27 | 99.8 | 160 |
| Example 27 | 0.2 | 16 | — | 13 | — | 29 | 99.8 | 158 |
| Example 28 | 0.2 | 16 | — | — | 15 | 31 | 99.8 | 155 |
| Example 29 | 0.2 | 16 | 4 | 4 | 4 | 28 | 99.8 | 158 |
| Example 30 | 1 | 16 | — | 13 | — | 29 | 99.8 | 144 |
| Example 31 | 1 | 16 | — | — | 15 | 31 | 99.8 | 142 |
| Example 32 | 1 | 6 | 6 | — | — | 12 | 99.8 | 147 |
| Example 33 | 1 | 37 | 11 | — | — | 48 | 99.8 | 134 |
| Example 34 | 3 | 16 | 11 | — | — | 27 | 99.8 | 110 |
| Example 35 | 3 | 16 | — | 13 | — | 29 | 99.8 | 110 |
| Example 36 | 3 | 16 | — | — | 15 | 31 | 99.8 | 105 |

INDUSTRIAL APPLICABILITY

According to the present invention, a high purity and high density ceramic scintillator with excellent transparency can be provided based on the fact that a sintered body of a lutetium oxysulfide phosphor contains an alkali metal element and phosphorus in an appropriate amount. The ceramic scintillator of the present invention is made possible to fully exert the characteristics such as high luminous efficiency inherent in the lutetium oxysulfide phosphor, thereby capable of improving light output even if miniaturized in size and therefore improving X-ray detection sensitivity. A radiation detector and a radiographic detection apparatus using such a ceramic scintillator provide a radiographic examination image with higher resolution and the like, thereby highly contributing to provision of, for example, medical diagnosis and industrial non-destructive inspection with high accuracy and the like.

What is claimed is:

1. A ceramic scintillator provided with a sintered body of a lutetium oxysulfide phosphor containing as an activator at least one element selected from Pr, Tb and Eu, and having a composition substantially expressed by General formula: $(Lu_{1-a}M_a)_2O_2S$ where M denotes at least one element selected from Pr, Tb and Eu, and a is a number satisfying $0.0001 \leq a \leq 0.2$, wherein the sintered body of the lutetium oxysulfide phosphor contains an alkali metal element in a range of 5 ppm or more and 15 ppm or less and phosphorus in a range of 5 ppm or more and 40 ppm or less, and has a relative density of 99.5% or more.

2. A ceramic scintillator according to claim 1, wherein the sintered body of the lutetium oxysulfide phosphor contains at least one alkali metal element selected from Li, K and Na.

3. A ceramic scintillator according to claim 1, wherein a radiation irradiation surface has a shape of a width of 0.1 to 1.0 mm and a length of 0.1 to 3.0 mm.

4. A radiation detector, comprising:
a fluorescence generation unit which is provided with the ceramic scintillator according to claim 1 and causes the ceramic scintillator to emit light according to incident radiation; and
a photoelectric conversion unit which receives light from the fluorescence generation unit and converts the light output into electrical output.

5. A radiographic examination apparatus, comprising:
a radiation source which emits radiation to an object; and
the radiation detector according to claim 4 which detects the radiation transmitting through the object.

6. A radiographic examination apparatus according to claim 5,
wherein the radiographic examination apparatus is an X-ray CT apparatus.

7. A ceramic scintillator according to claim 1,
wherein the sintered body of the lutetium oxysulfide phosphor contains the alkali metal element in a range of 6 to 10 ppm.

8. A ceramic scintillator according to claim 1,
wherein the sintered body of the lutetium oxysulfide phosphor contains the phosphorus in a range of 10 to 30 ppm.

9. A ceramic scintillator according to claim 1,
wherein the sintered body of the lutetium oxysulfide phosphor contains the alkali metal element in a range of 6 to 10 ppm and the phosphorus in a range of 10 to 30 ppm.

* * * * *